M. L. WELSH.
BREAD HOLDER OR STAND.
APPLICATION FILED SEPT. 24, 1915.

1,207,106.

Patented Dec. 5, 1916.

Inventor
Marie L. Welsh

Witnesses

By Victor J. Evans
Attorney

UNITED STATES PATENT OFFICE.

MARIE LOUISE WELSH, OF RICHMOND, VIRGINIA.

BREAD HOLDER OR STAND.

1,207,106.      Specification of Letters Patent.      Patented Dec. 5, 1916.

Application filed September 24, 1915. Serial No. 52,442.

*To all whom it may concern:*

Be it known that I, MARIE LOUISE WELSH, a citizen of the United States, residing at Richmond, in the county of Henrico and State of Virginia, have invented new and useful Improvements in Bread Holders or Stands, of which the following is a specification.

This invention is an improved bread holder or stand for use in connection with a plate for holding hot bread, cakes or similar articles and for serving the same and to prevent the same from getting wet, or "sweating" while awaiting consumption, the object of the invention being to provide an improved device of this character which is extremely cheap and simple, is strong and durable, is easily kept clean, which is sightly in appearance, and which is adapted for use either independently of or in connection with a plate, for holding hot bread, cake or the like in spaced relation to the plate and above the same to permit air to circulate between the plate and the bottom of the bread or cake, or for use independently of the plate and for serving the hot bread or cake.

The invention consists in the construction, combination and arrangement of devices hereinafter described and claimed.

Figure 1:
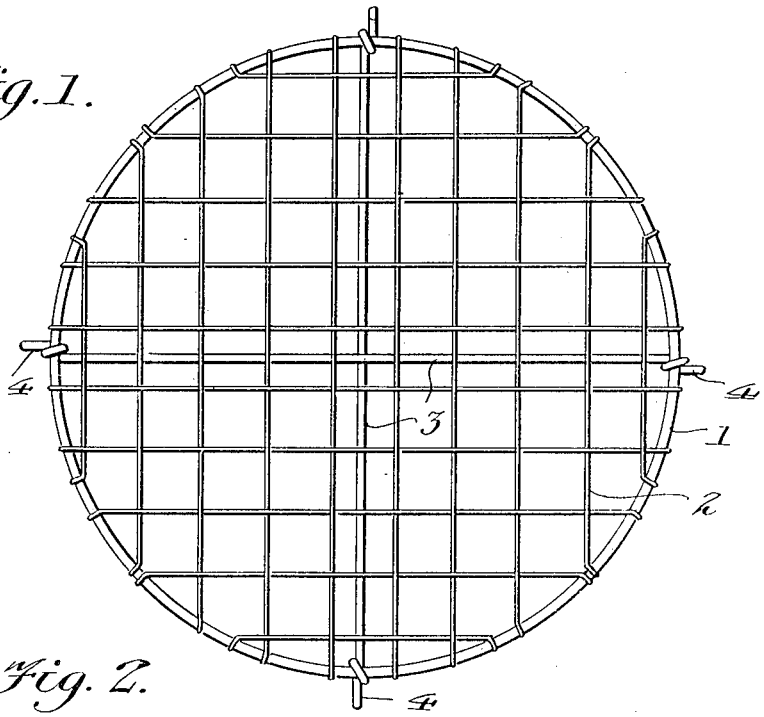
Figure 2:
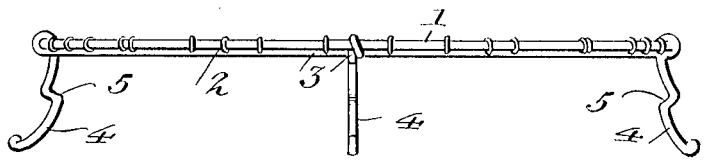
Figure 3:
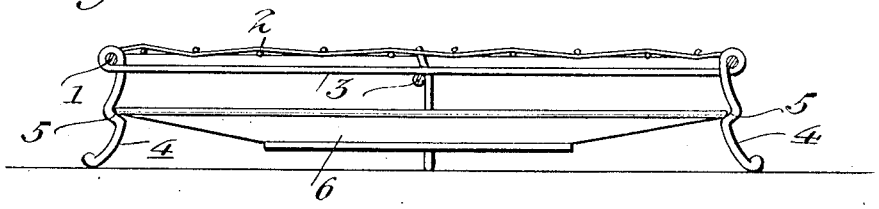

In the accompanying drawings,—Figure 1 is a plan of a hot bread holder and plate holder constructed in accordance with my invention. Fig. 2 is a side elevation of the same. Fig. 3 is a sectional view of the same, showing its arrangement for use in connection with a plate.

In the embodiment of my invention I provide a rim 1 which in practice is preferably made of wire, and which corresponds with the plan or outline of a plate, or other flat dish and is adapted to be arranged slightly above and on the edges thereof. A screen 2 of crossed wires covers the device, the ends of the crossed wires being attached to the rim, and said crossed wires being preferably on the upper side of the rim. Any suitable foraminous fabric may, if preferred, be substituted for the crossed wires. Brace wires 3 also extend across the rim, are arranged under the foraminous fabric, are attached to the rim, and their ends are downturned to form downwardly and outwardly curved supporting feet 4 which are adapted to bear directly on a table and to support the holder a suitable distance above the table. These feet are provided on their inner sides near their upper ends with bends 5 adapted to be engaged by the edge of an ordinary bread plate or other flat plate or platter 6 and thus enable the holder to be attached to the plate and arranged slightly above the plate, so that hot bread, cake or the like placed on the holder, will be held a slight distance above the plate, air will be permitted to circulate between the bottom of the bread or cake and the plate, and hence sweating of the bread or cake will be prevented. The holder being thus readily adapted to be attached to a plate, can be handled and passed from place to place, together with the plate, in the usual way, and moreover the holder when thus used in connection with a plate is entirely inconspicuous.

The holder is attractive in appearance and may be made of any suitable style and ornamented in any desired way and adapted for any style of table service. The plate serves to catch any drippings or crumbs that may fall from the cake, bread, or other article on the holder.

Having thus described my invention I claim:—

A hot bread or cake holder comprising a foraminous supporting fabric, and supports for said supporting fabric to space the same above a table or the like, said supports being feet, adapted to bear directly on a table or the like and provided on their inner sides at points above their lower ends with bends adapted to receive and permit the removal of the edge of a plate.

In testimony whereof I affix my signature in presence of two witnesses.

MARIE LOUISE WELSH.

Witnesses:
  JOHN B. WELSH,
  R. ALLEN AMMONS.

Copies of this patent may be obtained for five cents each, by addressing the "Commissioner of Patents, Washington, D. C."